(12) United States Patent
Futami et al.

(10) Patent No.: US 8,190,032 B2
(45) Date of Patent: May 29, 2012

(54) OPTICAL SIGNAL PROCESSING APPARATUS

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 12/340,177

(22) Filed: Dec. 19, 2008

(65) Prior Publication Data

US 2009/0097854 A1   Apr. 16, 2009

Related U.S. Application Data

(63) Continuation of application No. PCT/JP2006/312264, filed on Jun. 19, 2006.

(51) Int. Cl.
   *H04B 10/00* (2006.01)
(52) U.S. Cl. ........ 398/176; 398/155; 398/186; 398/188; 398/185
(58) Field of Classification Search .............. 398/98, 398/99, 155, 176, 186, 188, 185, 154, 183, 398/199
See application file for complete search history.

(56) References Cited

U.S. PATENT DOCUMENTS

| | | | | |
|---|---|---|---|---|
| 5,467,213 A * | 11/1995 | Kaede et al. | ................... | 398/155 |
| 5,473,458 A | 12/1995 | Mamyshev et al. | | |
| 5,953,138 A | 9/1999 | Ellis | | |
| 6,201,621 B1 * | 3/2001 | Desurvire et al. | ............ | 398/154 |
| 6,556,326 B2 * | 4/2003 | Bergano | ........................ | 398/183 |
| 6,580,843 B2 * | 6/2003 | Doi et al. | ........................ | 385/14 |
| 6,718,142 B1 * | 4/2004 | Murai | ............................ | 398/183 |
| 6,865,306 B2 * | 3/2005 | Doi et al. | ........................ | 385/14 |
| 6,882,802 B2 * | 4/2005 | Ohhira | ............................ | 398/188 |
| 6,950,612 B2 * | 9/2005 | Murai | ............................ | 398/176 |
| 7,085,498 B2 * | 8/2006 | Lee et al. | ......................... | 398/155 |
| 7,116,915 B2 * | 10/2006 | Murai | ............................ | 398/176 |
| 7,203,429 B2 * | 4/2007 | Bergano et al. | ............... | 398/208 |
| 7,206,519 B2 * | 4/2007 | Lee et al. | ......................... | 398/186 |
| 7,599,628 B2 * | 10/2009 | Bigo et al. | ...................... | 398/183 |
| 8,055,137 B2 * | 11/2011 | Wang et al. | .................... | 398/185 |
| 2003/0002121 A1 | 1/2003 | Miyamoto et al. | | |
| 2004/0161247 A1 * | 8/2004 | Murai | ............................ | 398/188 |
| 2005/0190432 A1 * | 9/2005 | Futami et al. | .................. | 359/299 |

FOREIGN PATENT DOCUMENTS

| | | |
|---|---|---|
| JP | 7-95756 | 10/1995 |
| JP | 8-242206 | 9/1996 |
| JP | 10-13351 | 1/1998 |
| JP | 10-508116 | 8/1998 |
| JP | 2003-87201 | 3/2003 |

(Continued)

OTHER PUBLICATIONS

Japanese Office Action issued Jan. 25, 2011 in corresponding Japanese Patent Application 2008-522194.

(Continued)

*Primary Examiner* — Kenneth N Vanderpuye
*Assistant Examiner* — Hibret Woldekidan
(74) *Attorney, Agent, or Firm* — Staas & Halsey LLP

(57) ABSTRACT

An O/E conversion element converts an input NRZ optical signal into an electric signal. A clock recovery circuit recovers a clock signal from the electric signal obtained by the O/E conversion element. A phase modulator applies phase modulation to the NRZ optical signal, using the recovered clock signal. An intensity modulator applies intensity modulation to the NRZ optical signal, using the recovered clock signal. A dispersion medium compensates for a frequency chirp of an optical signal output from the intensity modulator.

8 Claims, 13 Drawing Sheets

FOREIGN PATENT DOCUMENTS

| | | |
|---|---|---|
| JP | 2004-254242 | 9/2004 |
| JP | 2004-274643 | 9/2004 |
| JP | 2004-312676 | 11/2004 |
| JP | 2005-241902 | 9/2005 |
| JP | 2005-252805 | 9/2005 |
| JP | 2006-148900 | 6/2006 |

OTHER PUBLICATIONS

International Search Report (Form PCT/ISA/210) (Total 2 pages): International Application No. PCT/JP2006/312264; Search Report Mailing Date: Sep. 26, 2006.

* cited by examiner

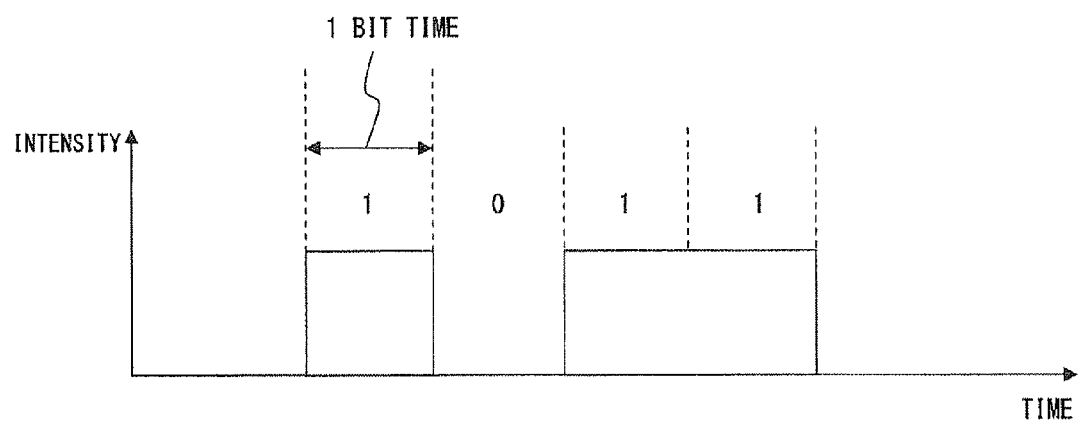
F I G. 5 A
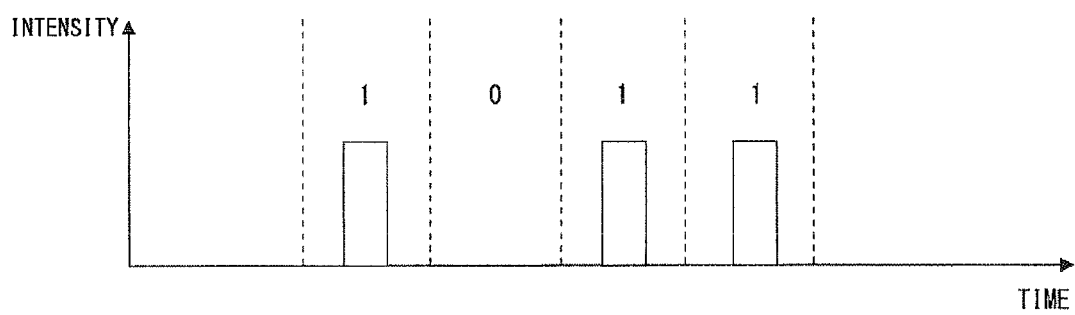
F I G. 5 B

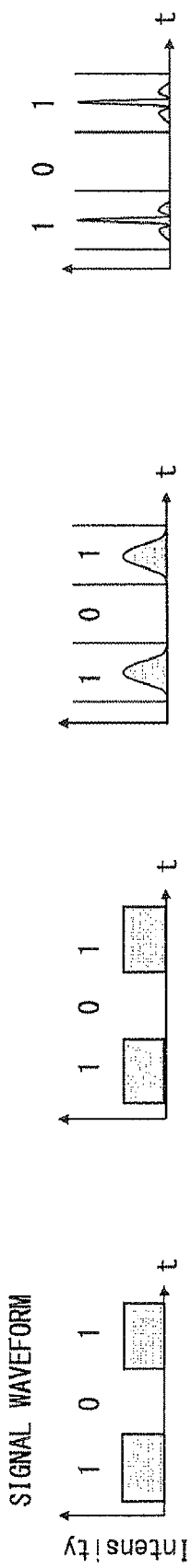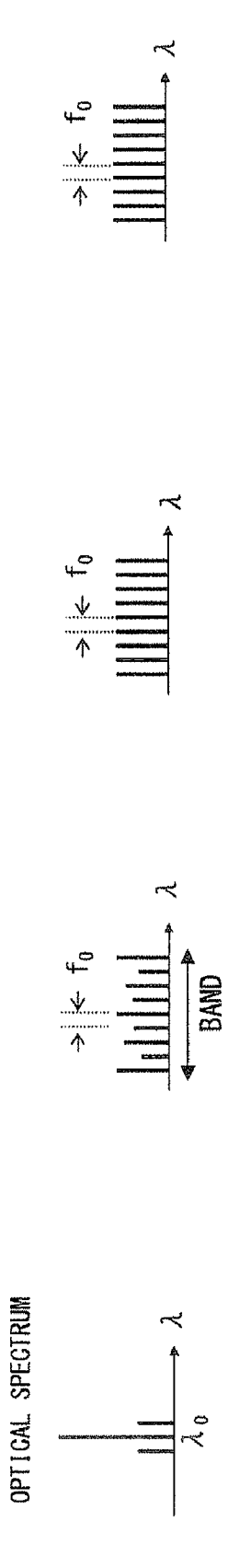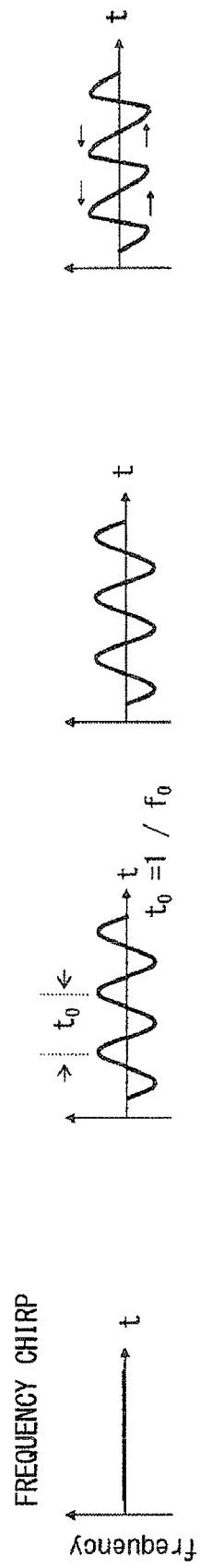

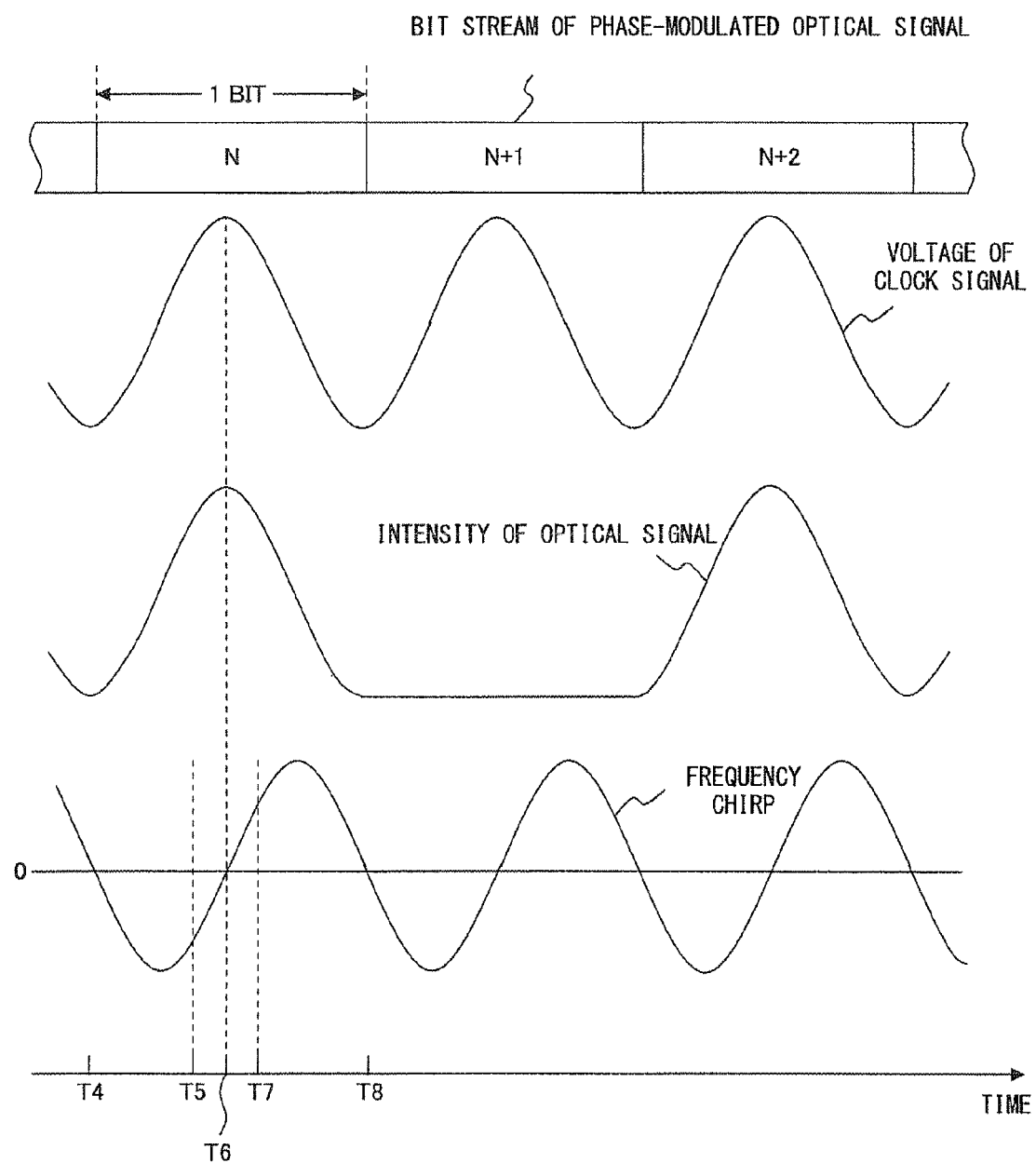
F I G. 9

SIGNAL WAVEFORM
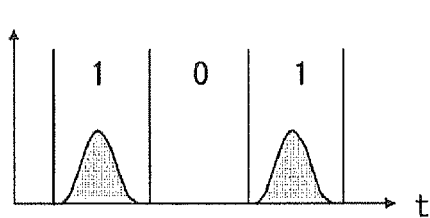
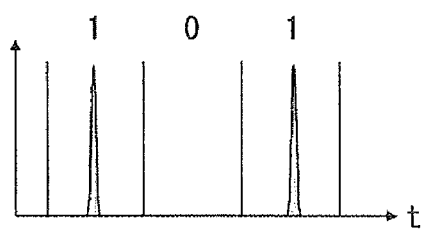
OPTICAL SPECTRUM
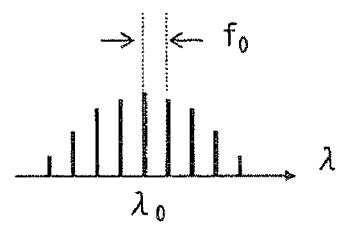
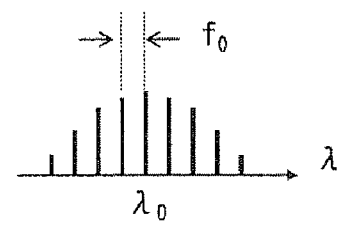
FREQUENCY CHIRP
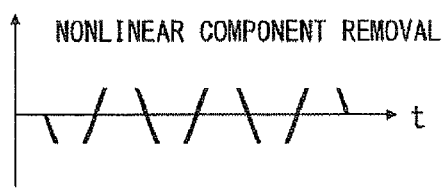
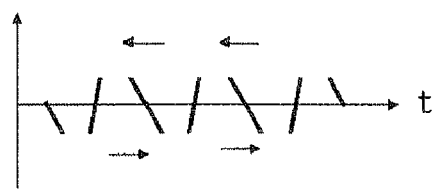
FIG. 11A
FIG. 11B

US 8,190,032 B2

OPTICAL SIGNAL PROCESSING APPARATUS

CROSS-REFERENCE TO RELATED APPLICATION

This application is a continuation of PCT application of PCT/JP2006/312264, which was filed on Jun. 19, 2006, the entire contents of which are incorporated herein by reference.

FIELD

The present invention relates to an apparatus for processing an optical signal and to an optical communication system, and can be applied to an apparatus for converting an NRZ optical signal to an RZ optical signal.

BACKGROUND

There has been an increasing need for expanding the capacity of an optical transmission path. As one of techniques for realizing the capacity expansion of an optical transmission path, WDM (Wavelength Division Multiplexing) has been put into practice. In the WDM system, a plurality of data signals are transmitted through an optical fiber, using a plurality of different wavelengths. However, the speed of an optical signal propagated through the optical transmission path is dependent on the wavelength. For this reason, when, for example, a plurality of optical signals transmitted from a plurality of clients are multiplexed by a WDM apparatus and transmitted to a server, a long distance between the WDM apparatus and the server would result in the optical signals arriving at the server one another at different timing. In this case, with some applications, the server has to wait for the arrival of all optical signals before it can start data processing, which would hinder high-speed processing. Therefore, if an application is to be affected by a transmission delay-time difference in the optical transmission path, the signal capacity needs to be expanded, not in the WDM transmission, but in TDM (Time Division Multiplexing) transmission.

In order to expand the signal capacity in the TDM transmission, the pulse width of the optical signal needs to be narrow. In other words, the data needs to be transmitted using RZ (Return to Zero) modulation. For the current optical communication systems, however, the data modulation is performed mainly using NRZ (Non-Return to Zero) method. Therefore, a technique for converting an NRZ signal to an RZ signal plays an important role. Meanwhile, a pulse light source for generating a very short pulse for realizing high-speed communication is generally expensive and the apparatus is large in size.

FIG. 1 is a diagram illustrating an example of an optical communication system in which an NRZ signal is converted into an RZ signal and then transmitted in TDM. In FIG. 1, each conversion circuit 1 converts an NRZ signal output from a corresponding transmission apparatus into an RZ optical signal. A TDM apparatus 2 multiplexes the plurality of RZ optical signals and transmits the multiplexed signal to a receiving apparatus. Recently, a system has been reported, in which a several-dozen-Gbps TDM-RZ optical signal is generated and transmitted, by multiplexing several-Gbps NRZ optical signals.

FIG. 2 is a diagram illustrating an example of a conventional optical NRZ/RZ conversion circuit. In FIG. 2, an O/E conversion element 11 converts an NRZ optical signal into an electric signal. Here, the bit rate of the NRZ optical signal is assumed to be B [bps]. A retiming circuit 12 recovers a clock signal from the electric signal obtained by the O/E conversion element 11. The frequency of the recovered clock signal is B [Hz]. At this time, jitter in the clock signal can be removed by the retiming circuit 12. The clock signal is provided to an intensity modulator 14 through a delay element 13. The intensity modulator 14 performs intensity modulation for the NRZ optical signal using the provided clock signal, and converts the NRZ optical signal into an RZ optical signal. The configuration is capable of converting an NRZ signal into an RZ signal while removing its jitter. An optical NRZ/RZ conversion circuit with the interposition of an electric signal is described in, for example, Patent Document 1 (Japanese Examined Patent Application Publication No. 7-95756) and Patent Document 2 (Japanese Patent Application Publication No. 2005-252805).

FIG. 3 is a diagram illustrating another example of a conventional optical NRZ/RZ conversion circuit. In FIG. 3, an NRZ optical signal is amplified by an optical amplifier 21 and then enters a nonlinear optical medium 22. The nonlinear optical medium 22 is an optical fiber such as a dispersion decreasing fiber. The pulse width of an optical signal is compressed in the nonlinear optical medium 22 by the negative dispersion and an adiabatic compression effect generated through the interaction due to the nonlinear effect. In other words, in the nonlinear optical medium 22, when the length of the nonlinear optical medium 22 and the nonlinear coefficient are determined appropriately, an NRZ optical signal is converted into an RZ optical signal. Since this configuration does not involve the interposition of an electric signal and the response time of the nonlinear effect of the optical fiber is very short, the pulse width of the optical signal can be compressed to less than one picosecond.

Meanwhile, for the optical communication system using TDM, a transmission rate equal to or more than 100 Gbps is expected to be required in the future. In that case, an optical signal having a pulse width equal to or less than one picosecond will be required. In addition, jitter in the optical signal needs to be removed, or suppressed sufficiently.

However, since the optical NRZ/RZ conversion circuit illustrated in FIG. 2 is configured to compress the optical pulse through a gate operation using an electric signal (i.e., the intensity modulation), the pulse width cannot be compressed sufficiently, due to the influence of the speed limitation in the electric circuit. The pulse width that can be obtained in a conventional electric circuit is limited to about 10 picoseconds. Meanwhile, although the pulse width can be compressed sufficiently in the NRZ/RZ conversion circuit illustrated in FIG. 3, jitter cannot be removed.

Thus, according to the conventional art, it has been difficult to generate a very short pulse (RZ optical signal) for high-speed optical communication, from an NRZ optical signal.

Meanwhile, Patent Document 3 (Japanese Patent Application Publication No. 2005-241902) describes, while it is not a technique for converting an NRZ optical signal into an RZ optical signal, a technique for generating an optical pulse for high-speed optical communication.

SUMMARY

According to an aspect of the invention, an optical signal processing apparatus includes an O/E conversion element for converting an NRZ optical signal into an electric signal; a recovery circuit for recovering a clock signal from the electric signal obtained by the O/E conversion element; a phase modulator for applying phase modulation to the NRZ optical signal, using the clock signal obtained by the recovery circuit; an intensity modulator for applying intensity modulation to an optical signal obtained by the phase modulator, using the clock signal obtained by the recovery circuit; and a dispersion medium that passes an optical signal obtained by the intensity modulator.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 5A is a diagram illustrating an NRZ signal.

FIG. 5B is a diagram illustrating an RZ signal.

FIGS. 6A-6D are diagrams illustrating the operations of the optical NRZ/RZ conversion circuit.

FIG. 9 is a diagram illustrating the operations of the intensity modulator.

FIGS. 11A and 11B are diagrams illustrating the operations of the optical NRZ/RZ conversion circuit according to another embodiment.

DESCRIPTION OF EMBODIMENTS

Figure 1:
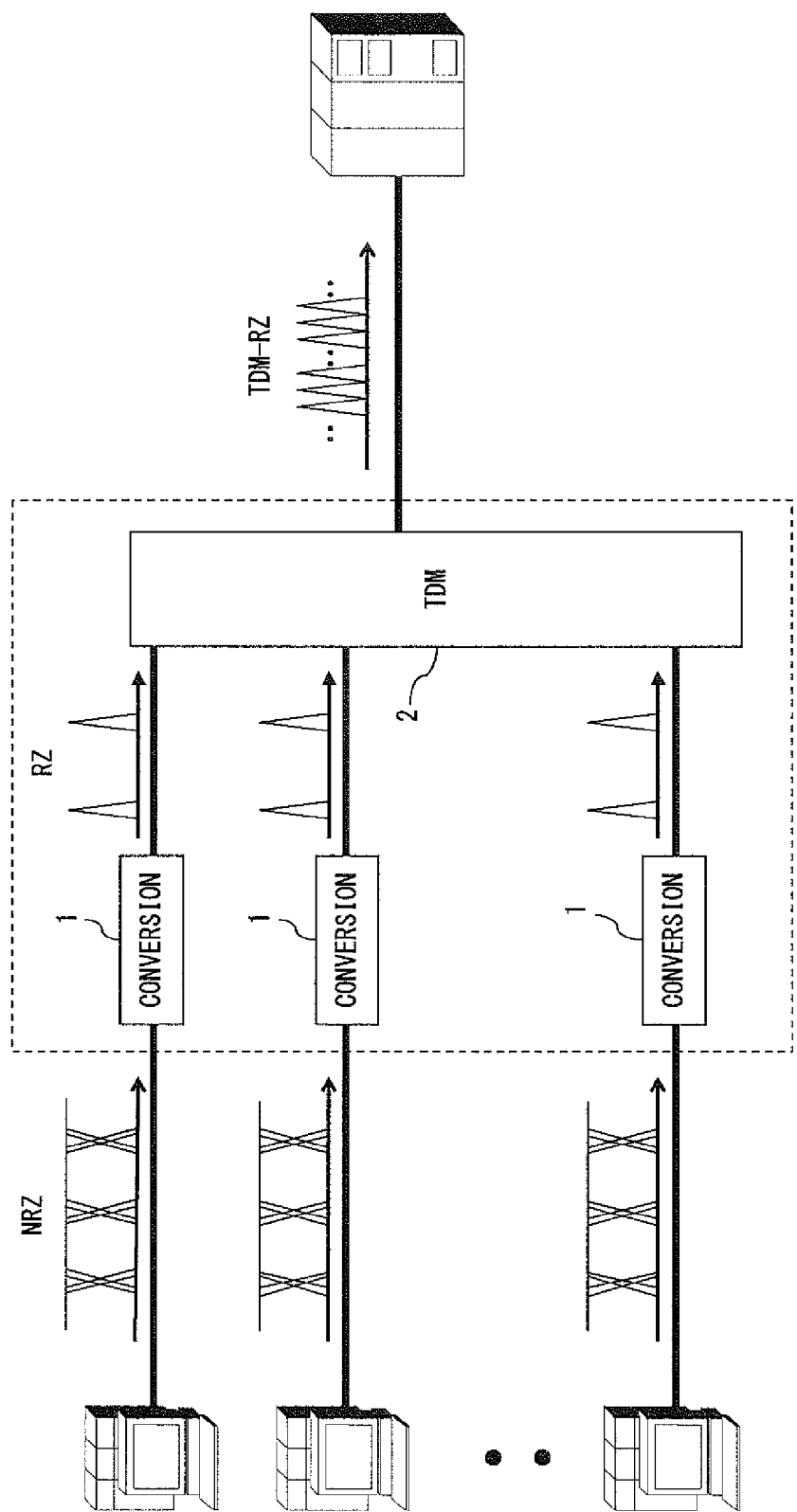
FIG. 1 is a diagram illustrating an example of an optical communication system in which an NRZ signal is converted into an RZ signal and then transmitted using TDM.
Figure 2:
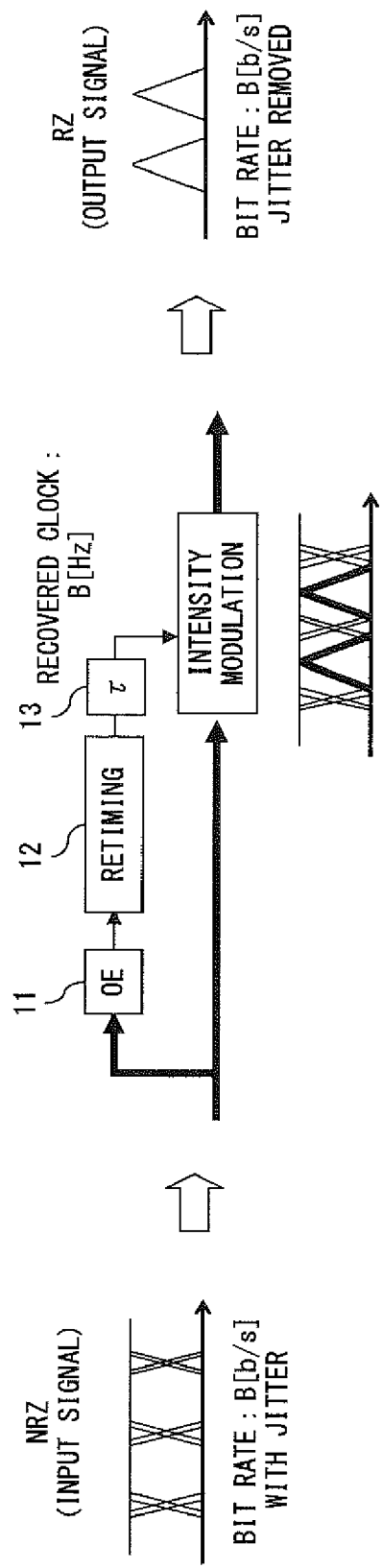
FIG. 2 is a diagram illustrating an example of a conventional optical NRZ/RZ conversion circuit.
Figure 3:
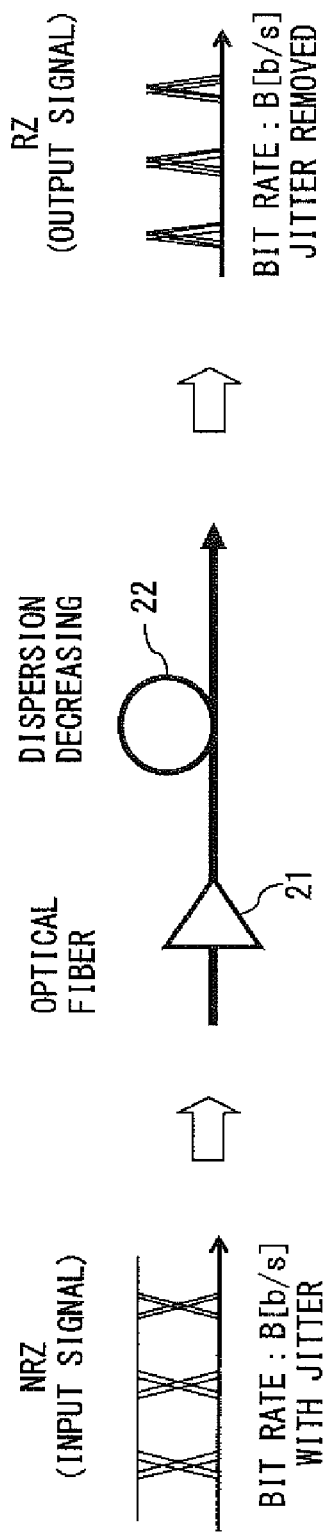
FIG. 3 is a diagram illustrating another example of a conventional optical NRZ/RZ circuit.
Figure 4:
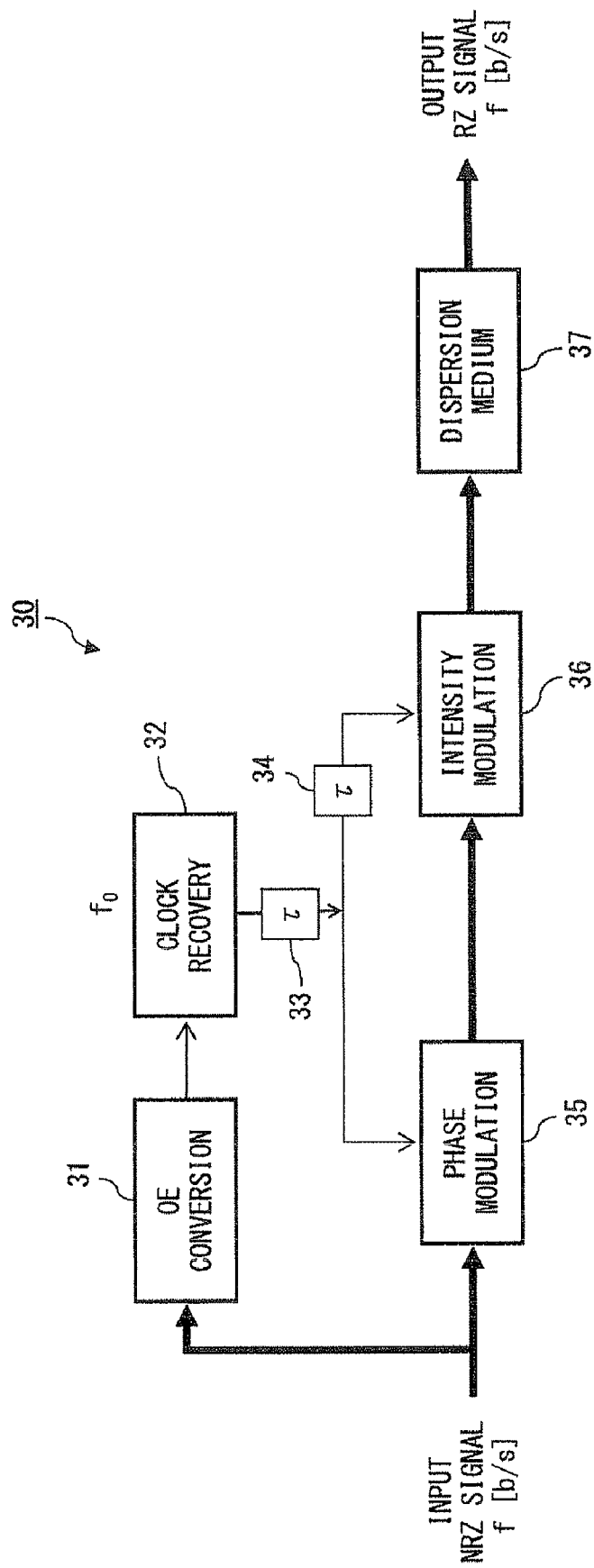
FIG. 4 is a diagram illustrating a configuration of an optical NRZ/RZ conversion circuit according to an embodiment of the present invention.

FIG. 4 is a diagram illustrating a configuration of an optical NRZ/RZ conversion circuit according to an embodiment of the present invention. Here, an optical NRZ/RZ conversion circuit 30 is an optical signal processing apparatus that outputs an RZ optical signal by converting an NRZ optical signal into the RZ optical signal.

In the NRZ modulation, as illustrated in FIG. 5A, the bit representing "1" corresponds to the light-emitting state (or the state in which the optical power is higher than a predetermined threshold level), and the bit representing "0" corresponds to the extinction state (or the state in which the optical power is lower than a predetermined threshold level). Meanwhile, in the RZ modulation, as illustrated in FIG. 5B, the bit representing "1" corresponds to the combination of the light-emitting state and the extinction state, and the bit representing "0" corresponds to the extinction state. Therefore, the conversion from an NRZ optical signal into the RZ optical signal is realized by narrowing the pulse width of the NRZ optical signal (in other words, by compressing the optical pulse in the time domain).

In FIG. 4, an input NRZ optical signal is spilt by an optical splitter and directed to a phase modulator 35 and an O/E conversion element 31. Here, the bit rate of the NRZ optical signal is assumed to be f[bps]. The wavelength of the light carrying the NRZ optical signal is $\lambda_0$.

The O/E conversion element 31 is configured including a photo diode, and converts the NRZ optical signal into an electric signal. A clock recovery circuit 32 recovers a clock signal from the electric signal obtained by the O/E conversion element 31. The frequency of the recovered clock signal is f[Hz]. In this embodiment, $f=f_0$. Meanwhile, the clock signal output from the clock recovery circuit 32 is, while it is not limited particularly, a signal whose voltage continuously changes in the time domain. The clock signal is, for example, a sine wave signal. The clock recovery circuit 32 can be realized by, for example, a phase-locked loop (PLL) circuit. The clock recovery circuit 32 can be realized also by a band-pass filter having a center frequency f[Hz]. It is preferable that the clock recovery circuit 32 is equipped with a function to remove jitter. In this regard, the function to remove jitter of an electric signal has been a known technique.

The clock signal output from the clock recovery circuit 32 is provided to the phase modulator 35 via a delay element 33, and to an intensity modulator 36 via the delay element 33 and a delay element 34. At this time, the clock signal is used as a drive signal for the phase modulator 35 and the intensity modulator 36. The delay time of the delay elements 33 and 34 is described later. Meanwhile, the amplitude of the clock signal provided to the phase modulator 35 and the amplitude of the clock signal provided to the intensity modulator 36 may be individually controlled by an amplifier or an attenuator not illustrated in the drawing.

The phase modulator 35 applies phase modulation to the NRZ optical signal, using the clock signal recovered by the clock recovery circuit 32. The phase modulator 35 is, while it is not limited particularly, for example, an LN ($LiNbO_3$) modulator, or an InP modulator.

The intensity modulator 36 applies intensity modulation to an optical signal output from the phase modulator 35, using the clock signal recovered by the clock recovery circuit 32. The intensity modulator 36 is, while is it not limited particularly, an LN modulator or an InP modulator having a Mach-Zehnder configuration. The phase modulator 35 and the intensity modulator 36 may be integrated on a single chip. In this case, insertion loss of the modulators is suppressed and the optical SNR is improved.

An optical signal output from the intensity modulator 36 enters a dispersion medium 37. The dispersion medium 37 is realized by, while it is not limited particularly, for example, an optical fiber (normal dispersion single mode fiber, dispersion compensation fiber and so on), a photonic crystal fiber, a chirping fiber Bragg grating, a liquid crystal space optical phase modulator, or an AWG type optical phase modulator.

FIGS. 6A-6D are diagrams illustrating the operations of the optical NRZ/RZ conversion circuit 30, showing the waveform of the optical signal, the spectrum of the optical signal and the frequency chirp of the optical signal.

FIG. 6A illustrates the state of an NRZ optical signal input to the optical NRZ/RZ circuit 30. Here, the wavelength $\lambda_0$ of the light wave carrying an input NRZ optical signal is, while it is not particularly limited, for example, 1.55 µm. The frequency chirp of the light wave is assumed to be virtually zero, in the entire time domain. The NRZ optical signal enters the phase modulator 35.

Figure 7:
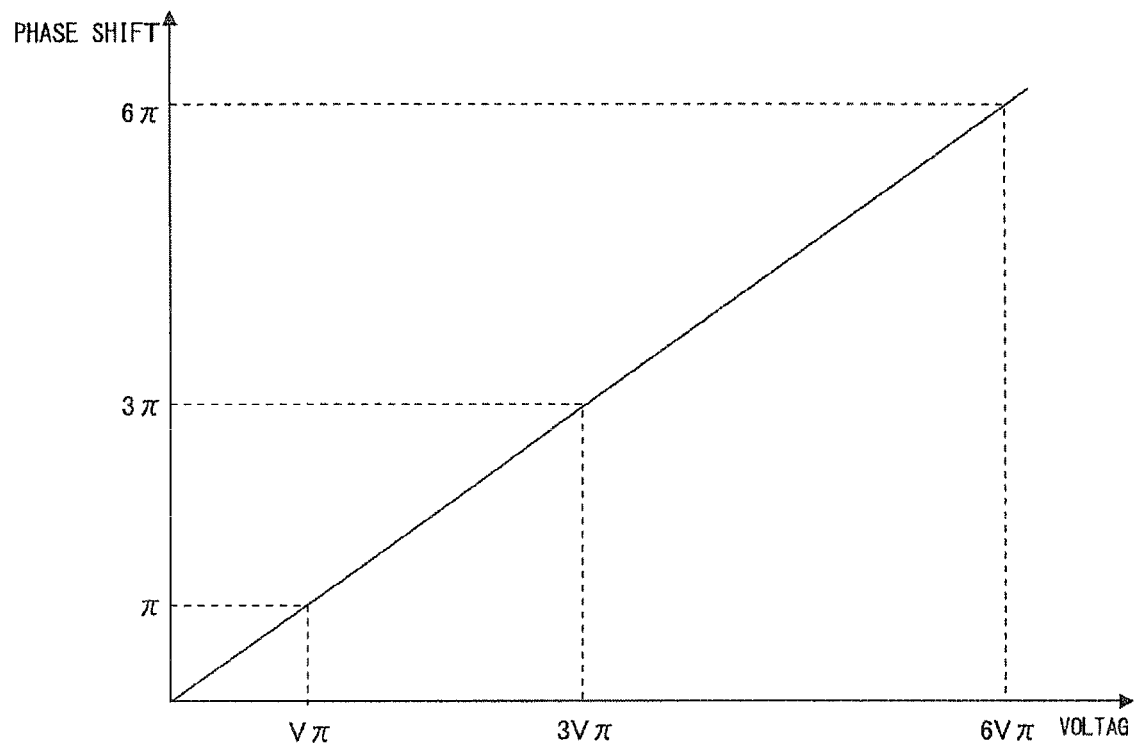
FIG. 7 is a diagram illustrating the characteristics of the phase modulator.

The phase modulator 35 applies phase modulation to the NRZ optical signal, in accordance with the voltage of the clock signal. In this embodiment, as illustrated in FIG. 7, the phase modulator 35 generates a phase shift that is approximately proportional to the voltage of the clock signal provided as the drive signal. Meanwhile, "$V\pi$" is a voltage for generating a phase shift $\pi$.

Figure 8:
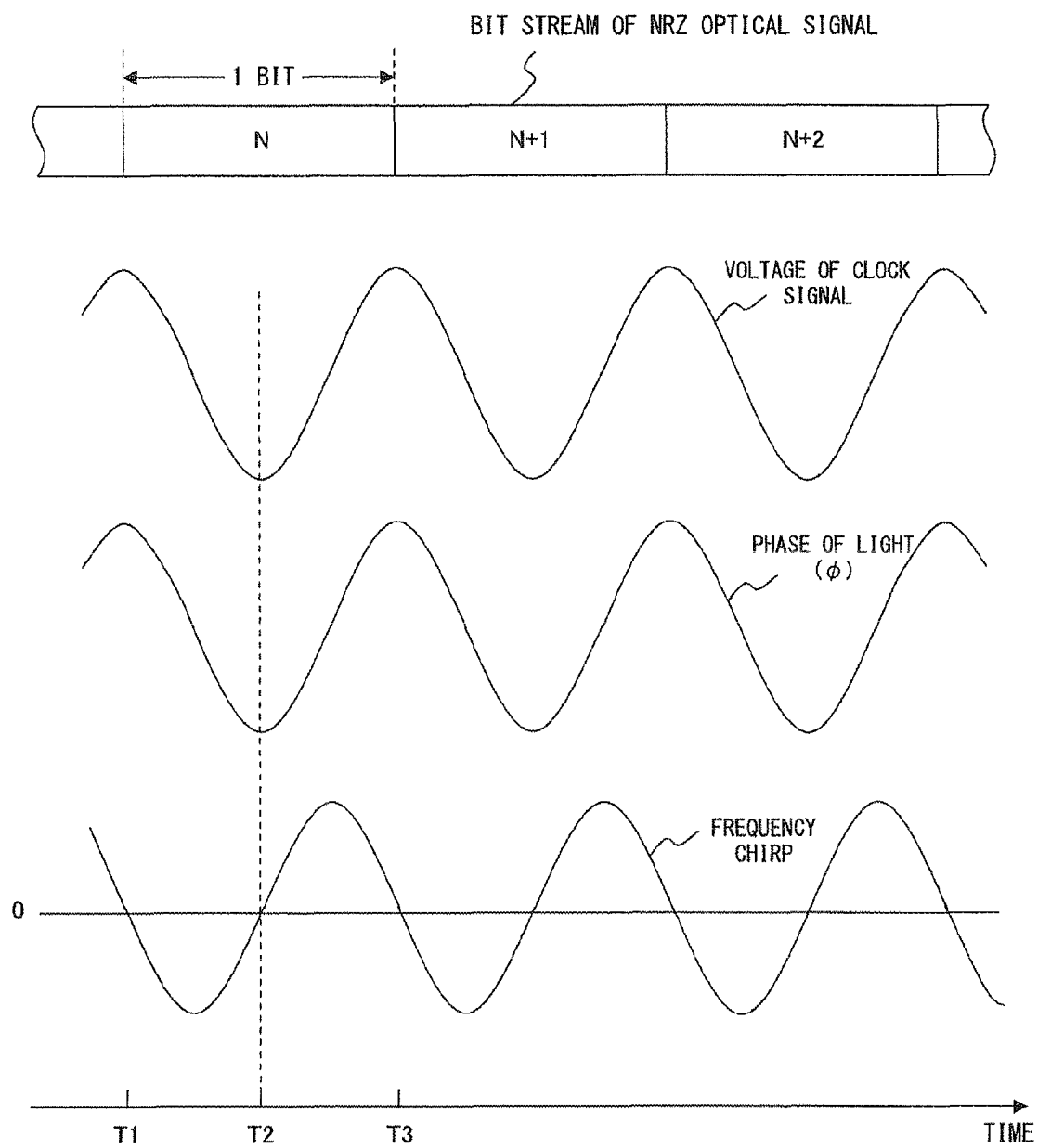
FIG. 8 is a diagram illustrating the operations of the phase modulator.

FIG. 8 is a diagram illustrating the operations of the phase modulator 35. The clock signal provided to the phase modulator 35 is adjusted so that the peak or local minimum of the voltage of the clock signal is positioned in the middle of each bit of the NRZ optical signal. In the example illustrated in FIG. 8, an Nth bit exists during the time T1-T3. The timing of the clock signal is adjusted so that the local minimum of the voltage of the clock signal is positioned at the time T2 (T3−T2=T2−T1). In this regard, the timing of the clock signal is adjusted using the delay element 33. While it is desirable that the clock signal is adjusted so that the peak or local minimum of its voltage is positioned in the middle of each bit of the NRZ optical signal, it may also be adjusted so that that the peak or local minimum of its voltage is positioned approximately in the middle of each bit.

When the clock signal adjusted as described above is provided as the drive signal for the phase modulator 35, the phase of the light wave carrying the NRZ optical signal changes in accordance with the voltage of the clock signal. In this regard, the amount of phase shift of the light wave is, as illustrated in FIG. 7, approximately proportional to the drive voltage. Therefore, the phase of an optical signal output from the phase modulator 35 changes in synchronization with the voltage of the clock signal. Meanwhile, the phase amplitude of the optical signal output from the phase modulator 35 is proportional to the voltage amplitude of the clock signal.

In the example illustrated in FIG. 8, the local minimum voltage of the clock signal is adjusted so that it is positioned in the middle of each bit of the NRZ optical signal. Here, it is assumed, for example, the local minimum voltage of the clock signal is zero, and the amplitude of the clock signal is $6V\pi$. Then, the amount of phase shift becomes zero in the middle area of each bit of the NRZ optical signal, and the amount of phase shift becomes $6\pi$ in the end areas of each bit of the NRZ optical signal.

A change of the phase of a light wave generates, as it is well known, a frequency chirp. In this regard, the frequency chirp is expressed with the temporal derivative of the phase ($d\phi/dt$). In the example illustrated in FIG. 8, a negative chirp is generated during the time T1-T2, and a positive chirp is generated during the time T2-T3. In addition, when the phase amplitude increases, the frequency chirp increases accordingly. In other words, a desired frequency chirp can be obtained by the appropriate adjustment of the voltage amplitude of the clock signal.

FIG. 6B illustrates the state of an optical signal output from the phase modulator 35. Phase modulation does not change the intensity of an optical signal. However, the band of the optical spectrum expands, when phase modulation is applied to an optical signal. At this time, the band of the optical spectrum is dependent on the phase amplitude generated by the phase modulation. In addition, a frequency chirp occurs as explained in reference to FIG. 8. The optical signal output from the phase modulator 35 is provided to the intensity modulator 36.

The intensity modulator 36 applies intensity modulation to the optical signal output from the phase modulator 35, in accordance with the voltage of the clock signal. At this time, the voltage amplitude of the clock signal is adjusted to, for example, equal to or smaller than $V\pi$. By doing so, the intensity of the optical signal peaks when the voltage of the clock signal peaks, and the intensity of the optical signal becomes approximately zero when the voltage of the clock signal is zero. Meanwhile, the configuration using a Mach-Zehnder interferometer as the intensity modulator has been a known art.

FIG. 9 is a diagram illustrating the operations of the intensity modulator 36. In FIG. 9, Nth and N+2th bits are assumed to be "1", and N+1th bit is assumed to be "0".

The intensity modulator 36 performs intensity modulation so as to extract an optical signal component in the time period (linear chirp area) in which the frequency chirp of the optical signal changes approximately linearly. In the example illustrated in FIG. 9, the Nth bit of the optical signal exists during the time T4-T8. The frequency chirp is zero at the time T6, and increases approximately linearly during the time period T5-T7. In this case, the intensity modulator 36 performs intensity modulation so as to extract the optical signal in the time period including and around the time T6.

The intensity modulation operation described above is realized by adjusting the timing of the clock signal provided to the intensity modulator 36. In other words, the clock signal provided to the intensity modulator 36 is adjusted so that the peak voltage of the clock signal is positioned approximately in the middle of each bit, in order to extract the optical signal component in the linear chirp area. In this regard, the timing of the clock signal is adjusted using the delay element 34.

FIG. 6C illustrates the state of an optical signal output from the intensity modulator 36. The optical signal output from the intensity modulator 36 has been intensity-modulated with respect to each bit. At this time, the optical signal has been modulated so that the optical intensity in the linear chirp area is large and the optical intensity in other time periods is small. As an example, the intensity modulation is performed so that the optical intensity has a peak when the frequency chirp is zero. Meanwhile, the spectrum of the optical signal output from the intensity modulator 36 is approximately equalized. The optical signal output from the intensity modulator 36 enters the dispersion medium 37.

FIG. 6D illustrates the state of an optical signal output from the dispersion medium 37. The dispersion medium (for example, an optical fiber) 37 is capable of compensating for the frequency chirp. In other words, a dispersion medium that is to be selected has characteristics with which the frequency chirp generated by the phase modulation is compensated for. In this regard, the dispersion medium generally has approximately linear chromatic dispersion characteristics. For this reason, the speed of the light propagated through the dispersion medium is dependent on the state of the frequency chirp. In the example illustrated in FIG. 6D, a dispersion medium used as the dispersion medium 37 has chromatic dispersion characteristics with which a light wave with a positive frequency chirp travels with a higher speed, and a light wave with a negative frequency chirp travels with a lower speed. In this case, the component subsequent to the middle of the optical pulse travels faster than the average speed, and the component preceding the middle of the optical pulse travels slower than the average speed. As a result, in the time domain, each optical pulse output from the intensity modulator 36 converges in the middle. In other words, the pulse width of the optical signal is compressed. An RZ optical signal is obtained as a result.

Meanwhile, when the phase of the clock signal provided to the phase modulator 35 is inverted, the sign of gradient (upchirp/down-chirp) of the frequency chirp in the time period extracted by the intensity modulator 36 is also inverted. However, in either case, the pulse width of the optical signal can be compressed by appropriately selecting the chromatic dispersion characteristics of the dispersion medium 37.

In addition, the pulse width of an optical signal is inversely proportional to the band width of the optical signal. The band of the optical signal is expanded by the phase modulation in the phase modulator 35, as explained in reference to FIG. 6B. Specifically, when the voltage amplitude of the clock signal provided to the phase modulator 35 is increased, making the frequency chirp larger, the pulse width of the optical signal output from the dispersion medium 37 becomes narrow. As an example, when phase amplitude 6π is provided, by the phase modulation, to an NRZ optical signal of which bit rate is 10 Gps, the pulse width of the output optical signal is compressed to about one picosecond.

Thus, in the optical NRZ/RZ conversion circuit 30 according to the embodiment, a clock signal is recovered after an NRZ optical signal is converted into an electric signal, and the NRZ optical signal is converted into an RZ optical signal using the clock signal. At this time, jitter in the electric signal can be suppressed easily. Therefore, the optical RZ signal can be obtained, with its jitter being suppressed.

In addition, while the optical NRZ/RZ conversion circuit 30 involves the interposition of an electric signal. However, the pulse width can be compressed sufficiently without being affected by the speed limitation of the electric circuit, since the compression of the pulse width of the optical signal is realized by optical actions (i.e., the generation of a frequency chirp by the phase modulation, the extraction of the liner chirp area by the intensity modulation, and the compensation for the frequency chirp using the dispersion medium).

In addition, the optical NRZ/RZ conversion circuit according to the embodiment is formed by a clock recovery circuit, a phase modulator, an intensity modulator and a dispersion medium, making it smaller in the circuit size and less expensive, compared to a short-pulse light source.

Figure 10:
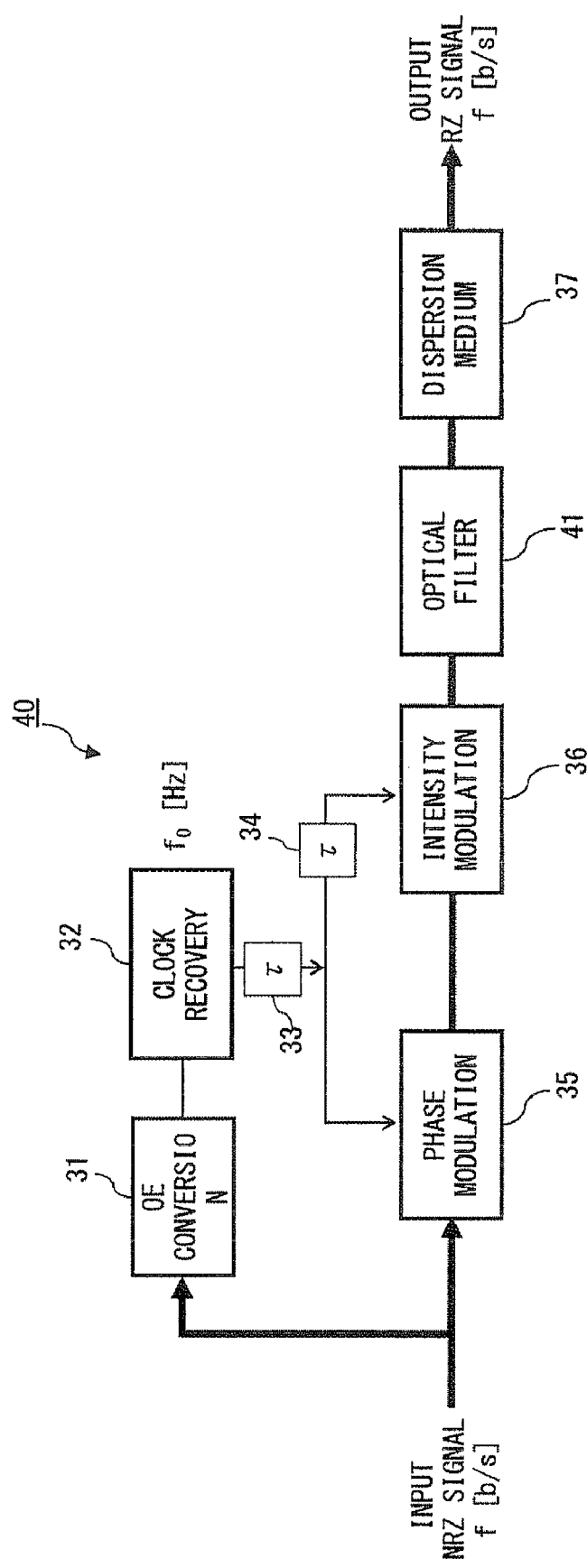
FIG. 10 is a diagram illustrating a configuration of an optical NRZ/RZ conversion circuit according to another embodiment of the present invention.

Furthermore, while the intensity modulator 36 is disposed at the output side of the phase modulator 35 in the configuration illustrated in FIG. 4, the optical signal processing apparatus of the present invention is not limited to this configuration. In other words, the same effect can be obtained by the same actions, with a configuration in which the intensity modulator 36 is disposed at the input side of the phase modulator 35. That is to say, the optical signal processing apparatus of the embodiment may have a modulator circuit to perform both phase modulation and intensity modulation. In this modulator circuit, the phase modulation may be performed prior to the intensity modulation, and the intensity modulation may be performed prior to the phase modulation. FIG. 10 is a diagram illustrating a configuration of an optical NRZ/RZ conversion circuit according to another embodiment of the present invention. The basic configuration of an optical NRZ/RZ conversion circuit 40 illustrated in FIG. 10 is the same as the optical NRZ/RZ conversion circuit 30 illustrated in FIG. 4. However, the optical NRZ/RZ conversion circuit 40 has an optical filter 41 between the intensity modulator 36 and the dispersion medium 37. The optical filter 41 has transmission characteristics with which the optical intensity spectrum is corrected to adjust the output optical waveform. The optical filter 41 is realized by, while it is not particularly limited, for example, a dielectric multilayer bandpass filter, an AWG-type optical bandpass filter, a fiber Bragg grating-type optical bandpass filter, a Fabry-Perot type optical bandpass filter, a photonic crystal-type optical bandpass filter, or a liquid crystal space optical intensity modulator.

FIG. 11A is a diagram illustrating the state of an optical signal output from the optical filter 41. The state of the input NRZ optical signal, the state of the optical signal output from the phase modulator 35, and the state of the optical signal output from the intensity modulator 36 are as described above, in reference to FIGS. 6A-6c.

The optical filter 41 is, in this embodiment, an optical bandpass filter having a center wavelength "$\lambda_0$". Therefore, in the spectrum of the optical signal output from the optical filter 41, the optical intensity is large at the wavelength $\lambda_0$, and the optical intensity decreases as the difference with respect to the wavelength $\lambda_0$ increases. In this regard, in the embodiment described in reference to FIG. 8-FIG. 9, the amount of phase shift is zero in the middle area of each bit, and the wavelength of the light is $\lambda_0$ in that area. Therefore, the optical signal in the middle area of each bit passes through the optical filter 41, and the optical signal in the end areas of each bit is suppressed or removed. As a result, the optical signal component in the linear chirp area passes through the optical filter 41, and the optical signal in the nonlinear chip area is suppressed or removed. The output signal from the optical filter 41 is then input to the dispersion medium 37.

FIG. 11B illustrates the state of an optical signal output from the dispersion medium 37. In the dispersion medium 37, as described above, the frequency chirp is compensated for. At this time, the component in the nonlinear chirp area in the optical signal output from the optical filter 41 has been suppressed or removed. Therefore, in the waveform of an optical pulse output from the dispersion medium 37, the optical intensity in the skirt area is suppressed.

Meanwhile, the optical filter 41 is not necessarily disposed between the intensity modulator 36 and the dispersion medium 37, and may be disposed at the output side of the dispersion medium 37.

Figure 12:
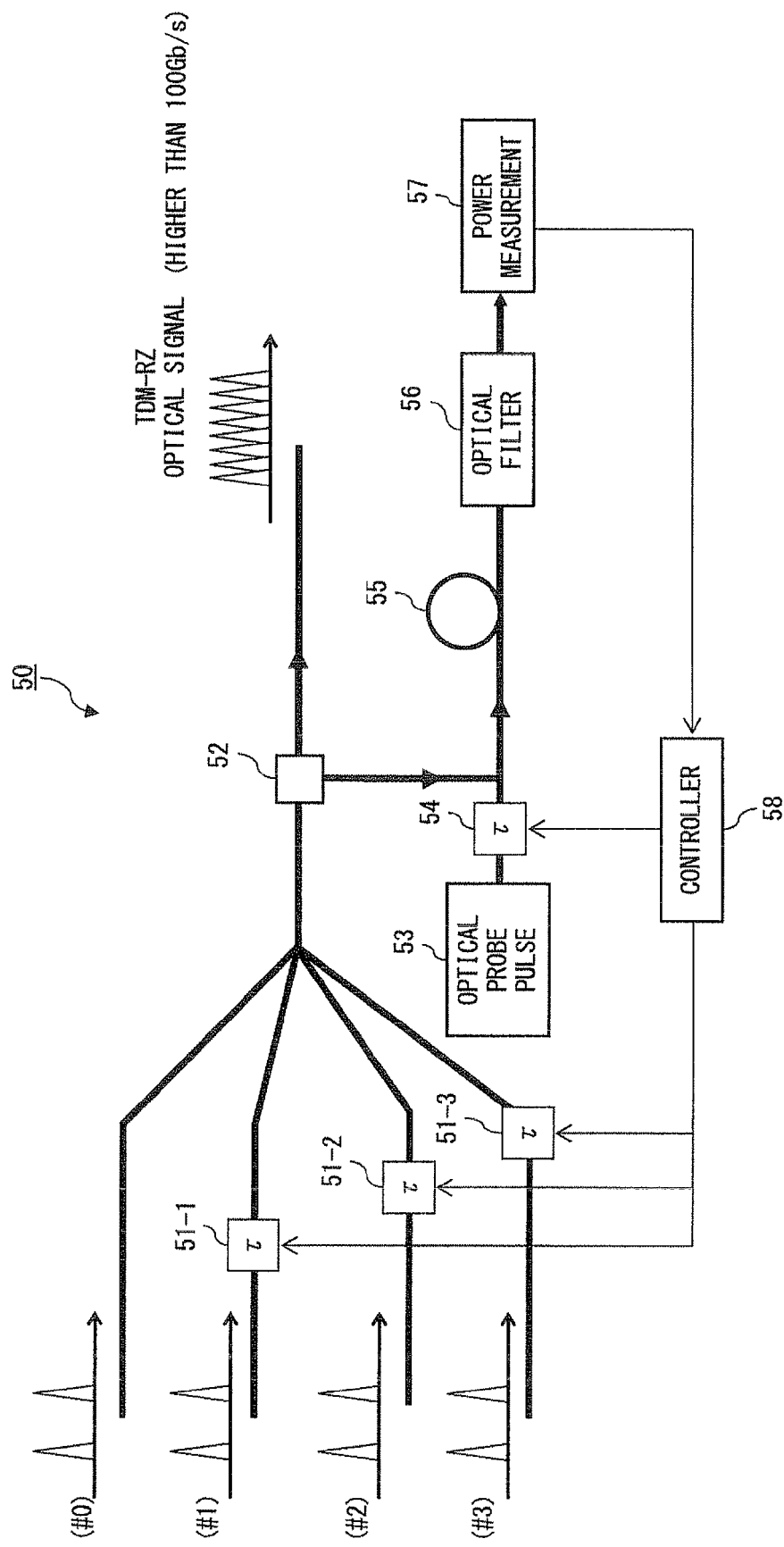
FIG. 12 is a diagram illustrating a TDM apparatus for multiplexing and transmitting a plurality of RZ optical signals.

FIG. 12 is a diagram illustrating a TDM apparatus for multiplexing and transmitting a plurality of RZ optical signals. A configuration for multiplexing four RZ optical signals (#0-#3) is illustrated here. Each RZ optical signal is assumed to be obtained with the optical NRZ/RZ conversion circuit illustrated in FIG. 4 or FIG. 10. In addition, the bit rate f of each RZ optical signal is supposed to be the same, and the wavelength $\lambda_0$ of the light carrying each RZ optical signal is also supposed to be the same. Assuming that the bit rate f of each RZ optical signal is 40 Gbps in the TDM apparatus having the above configuration, the bit rate of a multiplexed optical signal would be 160 Gbps.

The RZ optical signals (#0-#3) are multiplexed by an optical coupler and the like. At this time, optical delay elements 51-1 through 51-3 respectively delay corresponding RZ optical signals (#1-#3). The optical delay elements 51-1 through 51-3 are variable delay elements, and the delay amount of each of the delay elements is adjusted by a controller 58. The multiplexed optical signal is output to the transmission path, while a part of it is directed to a nonlinear optical fiber 55 by an optical coupler 52.

An optical probe pulse generation circuit 53 generates an optical probe pulse stream. The repetition frequency f[Hz] of the optical probe pulse stream is the same as the bit rate f[bps] of each RZ optical signal. The wavelength $\lambda_p$ of the light carrying the optical probe pulse is different from the wavelength $\lambda_0$ of the light carrying each RZ optical signal. The optical probe pulse enters the nonlinear optical fiber 55 via an optical delay element 54. The optical delay element 54 is a variable delay element of which delay amount is adjusted by the controller 58.

The multiplexed optical signal and the optical probe pulse enter the nonlinear optical fiber 55. At this time, as the pulse of the multiplexed signal and the optical probe pulse simultaneously exist in the nonlinear optical fiber 55, an idler light is generated by FWM (Four Wave Mixing) being a nonlinear effect. The wavelength $\lambda_a$ of the idler light satisfies the condition "$\lambda_a - \lambda_p = \lambda_p - \lambda_0$".

An optical filter 56 is a bandpass filter that passes the wavelength $\lambda_a$. In other words, the optical filter 56 extracts the wavelength component of the idler light. A power measurement circuit 57 measures the power of an output light from the optical filter 56. In other words, the power measurement circuit 57 measures the power of the idler light. The controller 58 adjusts the delay amount of the optical delay elements 51-1 through 51-3, in accordance with the measurement result in the power measurement circuit 57.

FIG. 13 is a diagram illustrating the operations of the TDM apparatus illustrated in FIG. 12. It is assumed here that the timing of multiplexing for an RZ optical signal (#3) contained in the multiplexed optical signal is to be adjusted.

Figure 13A:
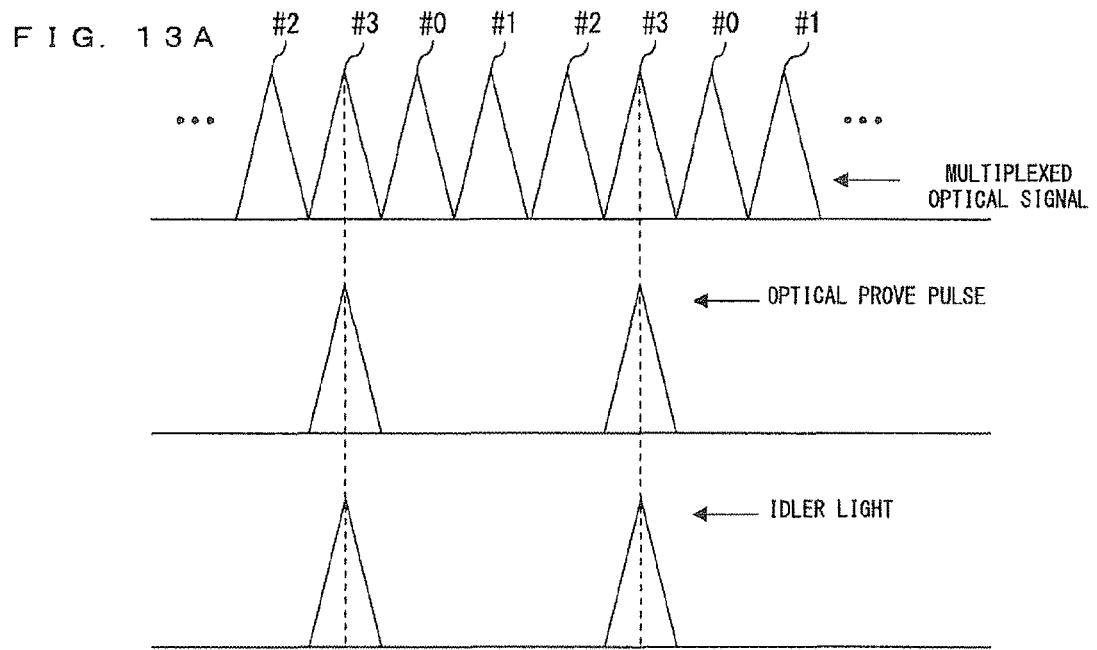
FIGS. 13A and 13B are diagrams illustrating the operations of the TDM apparatus shown in FIG. 12.
Figure 13B:
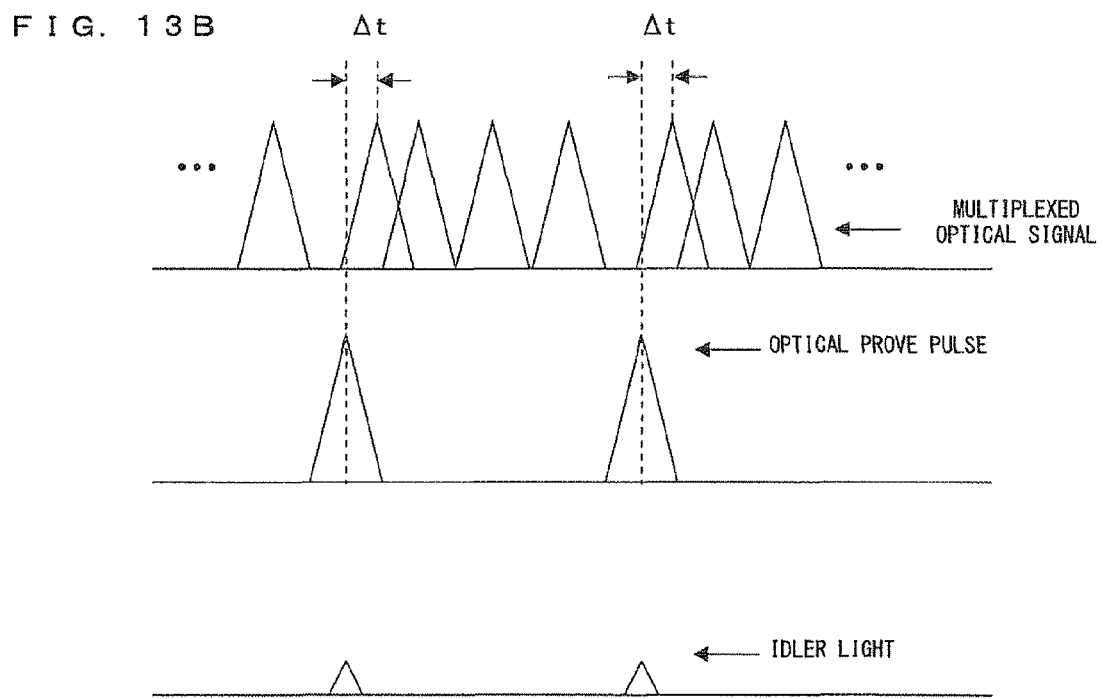

When the timing of multiplexing for the RZ optical signal (#3) is adjusted appropriately, the power of the idler light generated in the nonlinear optical fiber 55 is large, as illustrated in FIG. 13A. On the other hand, if the timing of multiplexing for the RZ optical signal (#3) is not adjusted appropriately, the power of the idler light generated in the nonlinear optical fiber 55 is small, as illustrated in FIG. 13B. Therefore, the controller 58 adjusts the delay amount of the optical delay element 51-3 so that the optical power of the idler light becomes maximum, thereby adjusting the timing of multiplexing for the RZ optical signal (#3) appropriately. The RZ optical signals (#1, #2) are adjusted in the same manner. The switch of the channel to be adjusted is realized by adjusting the delay amount of the optical delay element 53.

The timing of multiplexing for each RZ optical signal is adjusted appropriately by adjusting the delay amount of the delay elements 51-1 through 51-3 as described above, thereby generating a TDM-RZ optical signal.

As described above, in the optical signal processing apparatus of the embodiment, a frequency chirp is generated by phase modulation. In addition, a time period having a predetermined frequency chirp is extracted by intensity modulation. Then, the pulse width of the optical signal is compressed in a dispersion medium, by compensating for the frequency chirp of the optical signal in the extracted time period.

In the optical signal processing apparatus according to the embodiment, a clock signal is recovered after an NRZ optical signal is converted into an electric signal. The clock signal is used for phase modulation and intensity modulation. At this time, jitter in an electric signal can be suppressed easily. Therefore, an optical signal with suppressed jitter can be obtained from an NRZ optical signal. In addition, while the optical signal processing apparatus involves the interposition of an electric signal, the pulse width can be compressed sufficiently without being affected by the speed limitation of the electric circuit, since the compression of the pulse width of the optical signal is realized by an optical action (i.e., the generation of a frequency chirp and the compensation for the frequency chirp).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical signal processing apparatus comprising:
   an O/E conversion element for converting an NRZ optical signal into an electric signal;
   a recovery circuit for recovering a clock signal from the electric signal obtained by the O/E conversion element;
   a phase modulator for applying phase modulation to the NRZ optical signal, using the clock signal obtained by the recovery circuit;
   an intensity modulator for applying intensity modulation to an optical signal obtained by the phase modulator, using the clock signal obtained by the recovery circuit;
   a dispersion medium that passes an optical signal obtained by the intensity modulator,
   wherein the recovery circuit recovers and outputs a sine wave signal as a clock signal having a frequency corresponding to a bit rate of the NRZ optical signal, and the phase modulator applies phase modulation to the NRZ optical signal using the clock signal adjusted so that a local minimum or a peak of a voltage of the clock signal is positioned, in a time domain, in a middle or approximately in the middle of each bit of the NRZ optical signal.

2. The optical signal processing apparatus according to claim 1, wherein the intensity modulator extracts an optical signal in a middle area of each bit of the optical signal output from the phase modulator.

3. The optical signal processing apparatus according to claim 1, wherein the intensity modulator extracts an optical signal in a time period in which a frequency chirp generated by the phase modulation changes approximately linearly.

4. The optical signal processing apparatus according to claim 3, wherein the dispersion medium compensates for the frequency chirp of the optical signal in the time period extracted by the intensity modulator.

5. The optical signal processing apparatus according to claim 1, further comprising an optical filter for correcting an optical spectrum of the optical signal phase-modulated by the phase modulator.

6. The optical signal processing apparatus according to claim 5, wherein the optical filter removes or suppresses components on both sides of a center frequency of the phase-modulated optical signal.

7. An optical signal processing apparatus comprising:
   an O/E conversion element for converting an NRZ optical signal into an electric signal;
   a recovery circuit for recovering a clock signal from the electric signal obtained by the O/E conversion element;
   a modulation unit for applying phase modulation and intensity modulation to the NRZ optical signal, using the clock signal obtained by the recovery circuit; and
   a dispersion medium that passes an optical signal obtained by the modulation unit,
   wherein the recovery circuit recovers and outputs a sine wave signal as a clock signal having a frequency corresponding to a bit rate of the NRZ optical signal, and the modulation unit applies phase modulation to the NRZ optical signal using the clock signal adjusted so that a local minimum or a peak of a voltage of the clock signal is positioned, in a time domain, in a middle or approximately in the middle of each bit of the NRZ optical signal.

8. A TDM system comprising:
a plurality of optical signal processing apparatuses for respectively converting an NRZ optical signal into an RZ optical signal; and
a TDM apparatus for multiplexing a plurality of RZ optical signals obtained by the plurality of optical signal processing apparatus, wherein
each of the plurality of optical signal processing apparatuses is the optical signal processing apparatus according to claim 1.

* * * * *